United States Patent [19]
Goehre et al.

[11] Patent Number: 5,286,164
[45] Date of Patent: Feb. 15, 1994

[54] RADIAL BLOWER WITH BLOWER WHEEL ROTATING IN SPIRAL HOUSING

[75] Inventors: Jochen Goehre, Karlsruhe; Heinz Ruebig, Buehl-Eisental; Gerhard Zink, Buehl, all of Fed. Rep. of Germany

[73] Assignee: Robert Bosch GmbH, Stuttgart, Fed. Rep. of Germany

[21] Appl. No.: 872,640

[22] Filed: Apr. 22, 1992

[30] Foreign Application Priority Data

May 15, 1991 [DE] Fed. Rep. of Germany ....... 4115805

[51] Int. Cl.⁵ .................................................. F04D 17/12
[52] U.S. Cl. ............................... 415/199.3; 415/206; 415/208.2; 60/307
[58] Field of Search ........... 415/198.1, 199.1, 199.2, 415/199.3, 203, 204, 206, 208.1, 208.2, 208.3, 208.4, 209.1, 211.1, 211.2; 417/423.5; 60/307

[56] References Cited

U.S. PATENT DOCUMENTS

| | | |
|---|---|---|
| 1,610,360 | 12/1926 | Clements . |
| 3,289,923 | 12/1966 | Millman ............................ 415/199.3 |
| 3,338,682 | 8/1967 | Fowler et al. . |
| 3,712,065 | 1/1973 | Hurst ...................................... 60/307 |
| 4,938,661 | 7/1990 | Kobayashi et al. ............... 415/199.1 |
| 4,993,224 | 2/1991 | Phelps et al. ......................... 60/307 |
| 5,095,691 | 3/1992 | Yoshimura ............................ 60/307 |

FOREIGN PATENT DOCUMENTS

| | | |
|---|---|---|
| 131076 | 5/1902 | Fed. Rep. of Germany . |
| 1476578 | 9/1970 | Fed. Rep. of Germany . |
| 2216835 | 8/1974 | France . |
| 0063608 | 6/1978 | Japan ................................ 415/199.1 |
| 0041699 | 2/1989 | Japan ................................ 415/211.1 |
| 0189304 | 8/1991 | Japan ................................ 415/208.1 |

Primary Examiner—Edward K. Look
Assistant Examiner—Christopher M. Verdier
Attorney, Agent, or Firm—Michael J. Striker

[57] ABSTRACT

A radial blower for producing an air stream which is supplied as a secondary air to a waste gas stream of an internal combustion engine has a spiral housing having a substantially tangentially oriented blower output and accommodating a blower wheel which rotates in the spiral housing about a rotary axis in a rotary plane. The blower output forms with the rotary plane of the blower wheel an acute angle which converges in a flow direction of air. An air guiding chamber is provided with stationary guiding elements, and the blower output is open in the air guiding chamber. An overflow opening extends substantially radially to the rotary axis of the blower wheel. The guiding elements of the guiding chamber deviate an inflowing air substantially radially to the overflow opening. A second spiral housing accommodates a second blower wheel. The overflow opening opens in the central region of the second spiral housing.

10 Claims, 3 Drawing Sheets

RADIAL BLOWER WITH BLOWER WHEEL ROTATING IN SPIRAL HOUSING

BACKGROUND OF THE INVENTION

The present invention relates to a radial blower which has a radial wheel rotating in a spiral housing.

In order to increase the action of the controlled three-way catalysts it is known to use two methods, namely the waste gas recirculation and the secondary air supply. These methods minimize the generation of nitrogen or reduce the content of carbon monoxide and hydrocarbons before the waste gas reaches the catalyst. During the secondary air supply the waste gas supplies fresh air behind the motor in the shortest possible way to eliminate hydrocarbon compounds and carbon monoxide produced during the combustion process. Thereby post burning of the waste gas at temperatures of above 600° C. is obtained. During this additional combustion process heat is supplied to the catalyst. This is especially important during "cold start" when a relatively solid mixture is driven, whereby automatically the CO- and HC-fractions are increased in an over-proportional degree. Due to the secondary air supply in the hot waste gas practically a post burning is set in progress, during which the unburnt carbon monoxide and hydrocarbon in the motor are post-oxidated or post-burnt. The secondary air supply has however another effect. The control catalyst operates optimally starting from a predetermined operational temperature. This heat phase can continue for a limited time, during which the vehicle can cover several kilometers. After the post combustion through a secondary air supply system increase in this heat phase the waste gas temperatures. The higher temperatures allow faster reaction of the G-catalyst. The G-catalyst can earlier complete its function, namely to convert the pollutants.

With the secondary air supply there is however the difficulty to provide a compact, effectively operated blower which can overcome the high pressure in the exhaust train and pump sufficiently high quantity of fresh air into the waste train. It has to be taken into account that in the motor chamber as a rule there is only little space for additional aggregates so that compact construction for an efficient blower is an especially important criterium.

SUMMARY OF THE INVENTION

Accordingly, it is an object of the present invention to provide a radial blower with a blower wheel rotating in a spiral housing, which blower is as a rule a very efficient blower, wherein in accordance with the present invention it achieves the required high pressures.

In keeping with these objects and with others which will become apparent hereinafter, one feature of the present invention resides, briefly stated, in a radial blower in which the blower output forms with the rotary plane of the blower wheel an acute angle which converges in the flow direction of the air, the blower outlet opens into an air guiding chamber in which fixed guiding elements deviate the incoming air substantially radially to an overflow opening oriented in direction of the rotary axle of the blower wheel, and the overflow opening opens in a central region of a second spiral housing in which a second blower wheel is arranged.

A conventional one-stage blower can, with a corresponding fresh air throughflow, provide the required pressure of only 150 m bar, when its dimensions exceed the permissible dimensions significantly or extremely high rotary speed is provided, which however needs an expensive drive. When the blower is designed in accordance with the present invention, it has a compact construction, and in correspondence with the requirements of the end pressure of the blower it is possible to arrange, after the air guiding chamber, a second blower stage which in some cases supplies the air stream of a further blower stage through a second guiding chamber.

The inventive solution therefore provides the high efficiency of radial blowers with blower wheels rotating in the spiral housings, so that the required pressure and the desired air quantity can be achieved with small, multistage blowers.

In accordance with another feature of the present invention, the air guiding chamber is formed as a spiral housing, the vane-like guiding elements are arranged substantially concentrically relative to the overflow opening and radially to it and the outer ends of the vanes are spaced from the spiral inner wall by a certain distance which starting from the opening of the blower output changes in the flow direction of the air from a maximum value to zero.

The guiding vanes of the incoming air are curved so that their front surfaces enclose with the spiral inner wall of the guiding chamber an obtuse angle. The inner ends of the air guiding vanes extend close to the overflow opening. The distance of the outer ends of the guiding vanes to the spiral wall change in a uniform manner.

In accordance with still another feature of the present invention, the radial blower together with the air guiding chamber forms a partial aggregate which is associated with a further, correspondingly designed partial aggregate. The blower can have at least two partial aggregates with a blower stage arranged after them in the flow direction of the air and having a spiral housing with a blowing out opening communicating with the waste gas train of the internal combustion engine.

The blower can be provided with an electric drive motor. The pressure conduit leading from the blower to the waste gas train can be provided with a blocking element, for example a check valve. Finally, the pressure conduit can open into the exhaust conduit before a catalyst arranged in the waste gas train as considered in the flow direction of the waste gas.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
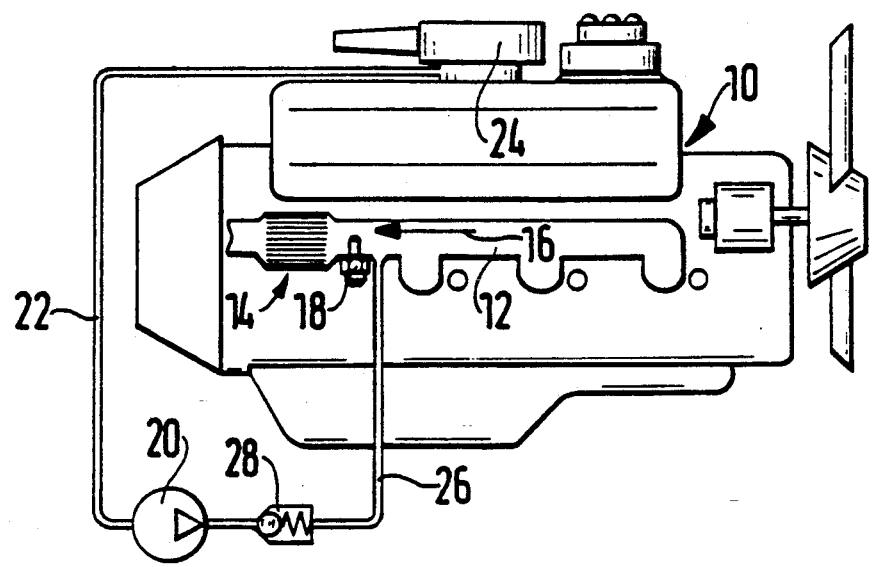
FIG. 1 is a view schematically showing an internal combustion engine of a motor vehicle with a secondary air supply by a secondary air supply conduit which leads to an exhaust train and is connected with an air filter.

An internal combustion engine of a not shown motor vehicle is identified in FIG. 1 with reference numeral 10 and has a waste gas train 12 in which a G-catalyst 14 is located. The waste gas flows in direction of the arrow 16. As considered in the flow direction of the waste gas, a so-called -probe 18 is located before the catalyst 14. Further, a blower 20 is provided and communicates through a suction conduit 22 with a fresh air supply 24 for the internal combustion engine 10. For this purpose the suction conduit 22 is connected with an air inlet for the internal combustion engine 10. From the blower 20 a pressure conduit 26 leads to the waste gas train 12. It opens, as considered in the flow direction of arrow 16, before the catalyst 14. Further, a check valve 28 is arranged in the pressure conduit 16. During inoperative blower 20 it prevents that the gas can reach the fresh air supply 24 for the internal combustion engine 10. The check valve 28 can however be replaced, when needed, by other means for example a magnetic valve.

Figure 2:
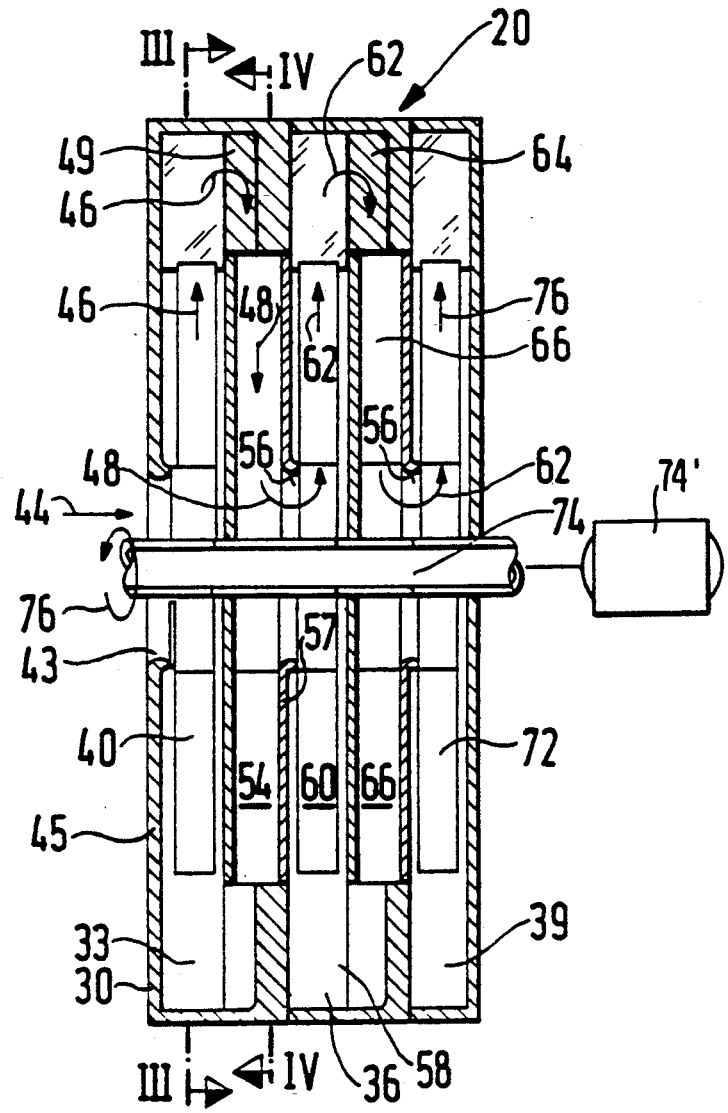
FIG. 2 is a view showing a longitudinal section of a radial blower in accordance with the present invention, in a section taken along the line II—II in FIGS. 3 and 4.
Figure 3:
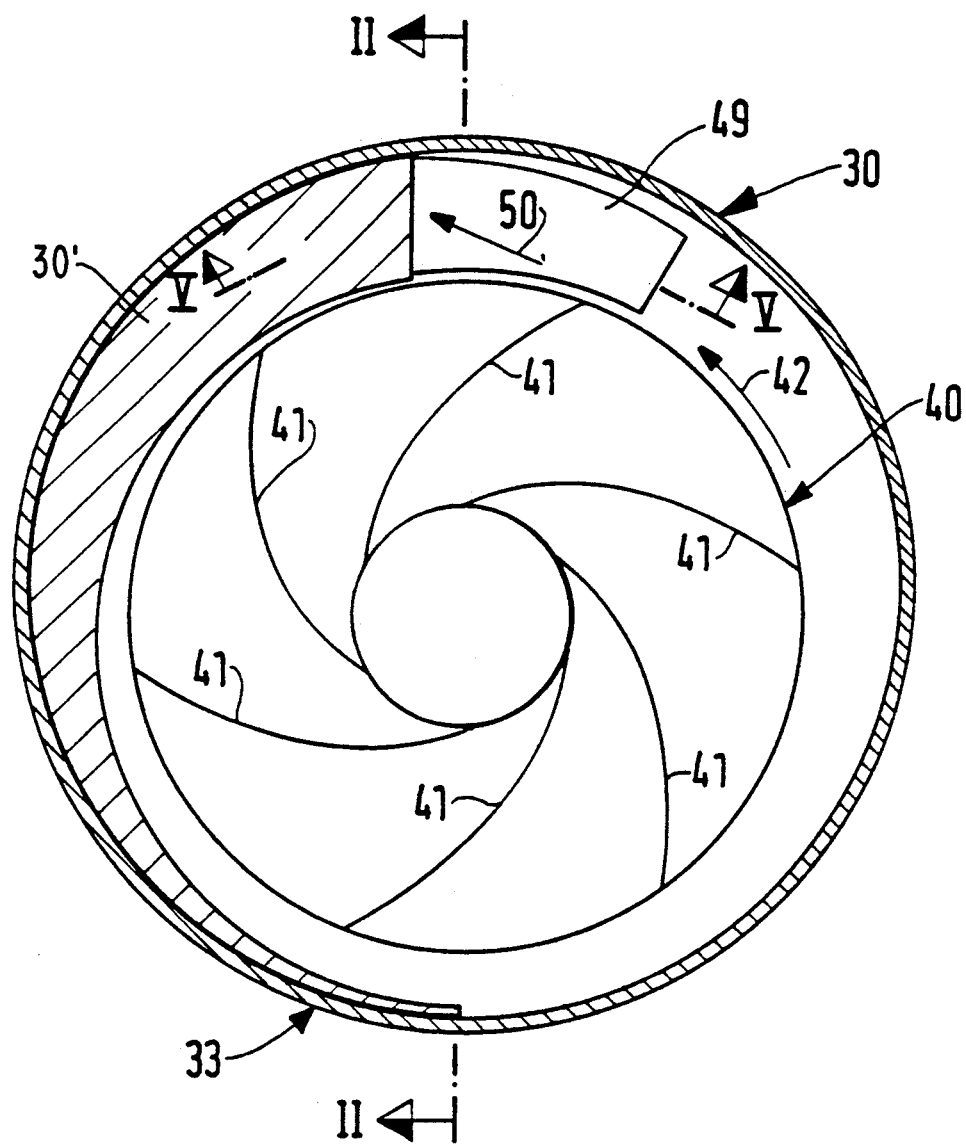
FIG. 3 is a view showing a section through the radial blower in accordance with the present invention in a section taken along the line III—III in FIG. 2.

The blower 20 is shown in a longitudinal section in FIG. 2. As can be seen particularly from FIG. 3, it is formed as a radial blower with a spiral housing 30. As shown in FIG. 2, the blower 20 has three blower stages 33, 36, 39 arranged one after the other. Each blower stage is formed as shown in FIG. 3. In other words, a radial blower wheel 40 with vanes 41 is rotatably arranged in the spiral housing 30 and its rotary direction is identified in FIG. 3 with an arrow 42. An insert 30' is arranged inside the housing to provide the housing 40 spiral shape.

The first blower stage 33 aspirates fresh air supplied through the suction conduit 22, in direction of the arrow 44 through a suction opening 43 in a housing wall 45 and displaces the fresh air in a radial direction identified with the arrow 46. The air leaves the spiral housing 30 through a blower output 49 as shown in FIG. 3. The blower output 49 is oriented substantially tangentially. However, with respect to a rotary plane 53 of the blower wheel 40, it is arranged so that its axis 55 as considered in the flow direction of arrow 42 forms with a rotary plane of the blower wheel 40 an acute angle $\alpha$ which converges in the flow direction of the displacement medium. Thereby the air which exits the first blower stage 33 flows in direction of the arrow 50 in an air guiding chamber 52 which is also formed as a spiral housing. In the air guiding chamber 52 vane-like, housing-fixed guiding elements 54 are arranged and oriented substantially radially to an overflow opening 56. The overflow opening 56 is provided in an intermediate wall 57 of the housing 30 and oriented in direction of the rotary axis of the blower wheel.

The overflow opening opens in a central region of a second spiral housing 58 which accommodates a second blower wheel 60. The blower wheel 60 corresponds to the blower wheel 40 of FIG. 3. The second spiral housing 58 completely corresponds to the first spiral housing 30. The air in the spiral housing 58 is further displaced by the second blower wheel 60, so that it flows in direction of the arrow 62 in FIG. 2 toward the blower output 64 of the second blower stage 36 and from there into the second guiding chamber 66.

The second guiding chamber 66 is also formed as a spiral housing in correspondence with a first guiding chamber.

Figure 4:
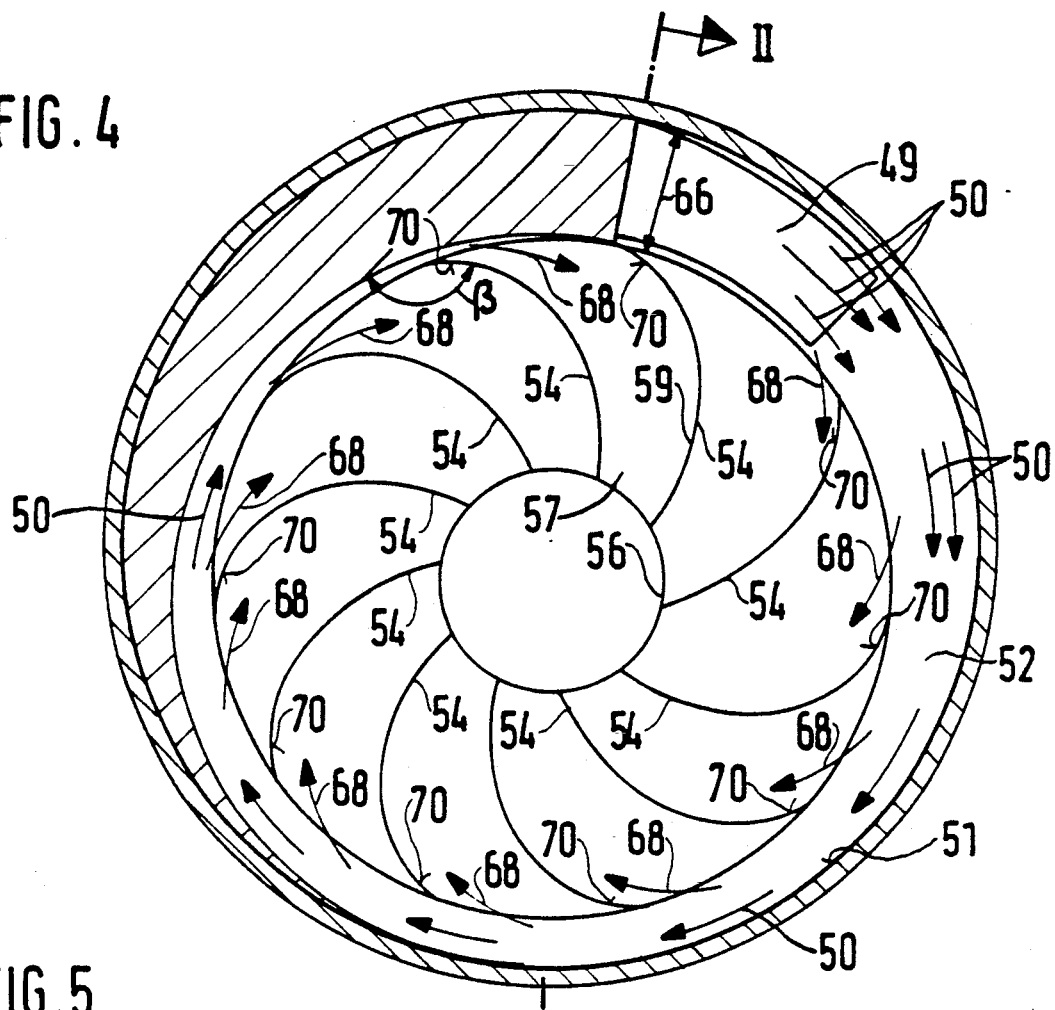
FIG. 4 is a view showing a radial blower in accordance with the present invention in a section taken along the line IV—IV in FIG. 2.
Figure 5:
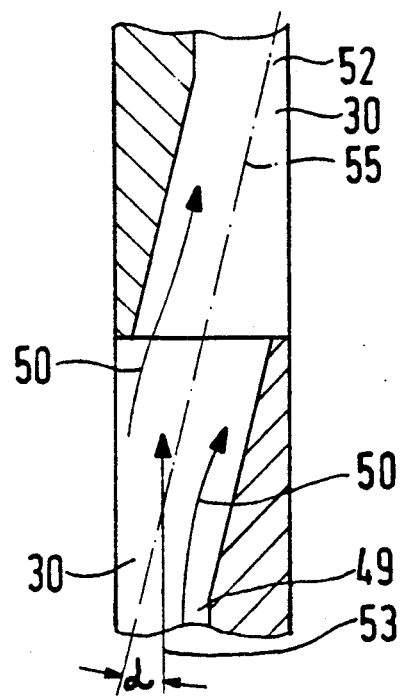
FIG. 5 is a partial section of the inventive radial blower, taken along the line V—V in FIG. 3.

The air entering these air guiding chambers as shown with arrows 50 in FIG. 4, follows the air stream of a spiral inner wall 51. Due to the special arrangement of the vane-like guiding elements 54 shown in FIG. 4 which extend substantially concentric to the overflow opening 56 and radial to them, when the same vane length is maintained the outer ends of the guiding vanes 54 are spaced from the spiral inner wall 51 by a distance which changes from a maximum value to zero, as considered in the flow direction of the air in accordance with the arrow 50, starting from the opening of the blower output 49. This is additionally shown in FIG. 4 for the guiding vane which is identified with reference numeral 59 and whose outer end is connected with the spiral inner wall 51.

As can be clearly seen from FIG. 4 and identified with reference numeral 68, the air entering the air guiding chamber 52 is subdivided into partial air streams whose number corresponds to the number of the vanes 54. It is clear that in the shown embodiment the change of the distance 66 from the outer end of the vane 54 and spiral inner wall 51 is performed uniformly, until it changes in the flow direction identified with reference numeral 50 from a maximum value for the vane 55 to zero. Further, it can be seen from FIG. 4 that the guiding vanes 54 of the incoming air are so curved that their front surfaces 70 which meet the air enclose with the spiral inner wall of the guiding chamber housing 52 an obtuse angle $\beta$. Furthermore, FIG. 4 shows that the inner ends of the guiding vanes 54 extend close to the overflow opening 56.

From the above description it is clear that the radial blower 33 together with its guiding chamber 52 forms a partial aggregate, and a further correspondingly formed partial aggregate 36, 66 is located after it. When the thrown air enters the second air chamber 66 through the second blower output 64, it is deflected inwardly until it reaches another overflow opening 56, where it is supplied to the third blower 39. A further acceleration or compression of air is performed in the blower 39. From the third blower 39 the air exits in a known manner in tangential direction from the blower and enters the pressure conduit 26.

It is known that in the shown embodiment no air guiding chamber has to be arranged after the third blower stage, since there the air discharge of the radial blower 20 is performed. The transition from the blower stage 39 to the pressure conduit 26 is performed preferably in the rotary plane of the blower wheel 72 of the third blower stage 39. The three blower wheels 40, 60 and 75 are fixedly arranged for rotation on a drive shaft 74 of a not shown electric motor. The shaft 74 is an extension of the armature shaft of the electric motor.

During the operation of the radial blower the air exits in correspondence with the arrow 44 from the suction conduit 22 in the first stage 23 of the radial blower 20. Therefore the shaft 74 rotates in direction of the arrow 76. The flowing-in air follows then in accordance with the arrows 46, 48 into the second blower stage 36, and from there in accordance with the arrow 62 flows into the third blower stage 39, and then in accordance with the arrow 76 is deviated in the third blower stage outwardly and reaches the pressure conduit 26.

It will be understood that each of the elements described above, or two or more together, may also find a useful application in other types of constructions differing from the types described above.

While the invention has been illustrated and described as embodied in a radial blower with a blower wheel rotating in a spiral housing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A radial blower for producing an air stream which is supplied as a secondary air to a waste gas stream of an internal combustion engine, comprising a spiral housing having a substantially tangentially oriented blower output and accommodating a blower wheel which rotates in said spiral housing about a rotary axis in a rotary plane, said blower output forming with said rotary plane of said blower wheel an acute angle which converges in a flow direction of an air stream; an air guiding chamber provided with stationary guiding elements, said blower output being open in said air guiding chamber; means forming an overflow opening which extends substantially radially to said rotary axis of said blower wheel, said guiding elements of said guiding chamber deviating the air stream substantially radially to said overflow opening; a second spiral housing accommodating a second blower wheel and having a central region, said overflow opening in said central region of said second spiral housing, said air guiding chamber being formed as a spiral housing having a spiral inner wall, said guiding elements being vane-like and arranged substantially concentrically to said overflow opening and radially to the latter, said guiding elements having outer ends which are spaced from said spiral inner wall by a distance which changes from said blower opening in the flow direction of the air stream from a maximum value to zero.

2. A radial blower as defined in claim 1, wherein said guiding elements are curved and have front surfaces facing the inflowing air, said front surfaces forming with said spiral inner wall an obtuse angle.

3. A radial blower as defined in claim 1, wherein said guiding elements have outer ends which are spaced from said spiral inner wall by a distance which continuously changes.

4. A radial blower as defined in claim 1, wherein said guiding elements have inner ends located adjacent to said overflow opening.

5. A radial blower as defined in claim 1, wherein said first mentioned spiral housing with said first mentioned blower wheel and said air guiding chamber form a partial aggregate; and further comprising at least one further partial aggregate which substantially correspond to said first mentioned partial aggregate and is arranged after the latter.

6. A radial blower as defined in claim 5, wherein said second mentioned partial aggregate has an outlet opening arranged to communicate with a waste gas train of the internal combustion engine.

7. A radial blower as defined in claim 1; and further comprising a drive including an electric drive motor.

8. A radial blower as defined in claim 1; and further comprising a pressure conduit extending from the blower and provided with a blocking element.

9. A radial blower as defined in claim 8, wherein said blocking element is a check valve.

10. A radial blower as defined in claim 1; and further comprising a pressure conduit extending from the blower and opening into an exhaust conduit of the internal combustion engine before a catalyst arranged in a waste gas train, as considered in a flow direction of the waste gas train.

* * * * *